June 30, 1931.  R. STRESAU  1,812,123
METHOD OF ELECTRICALLY WELDING THICK METAL PLATES
Filed Feb. 12, 1929    3 Sheets-Sheet 1
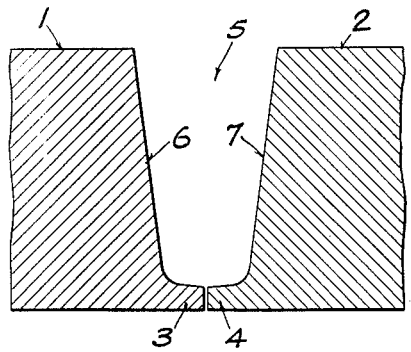
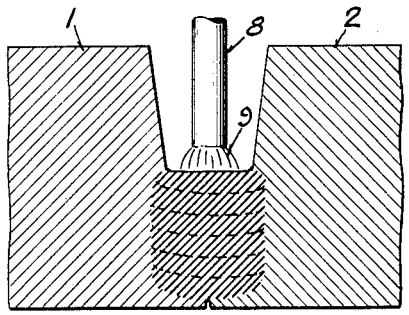
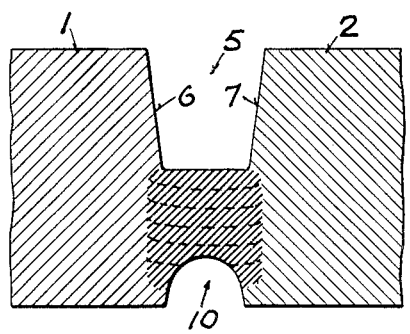
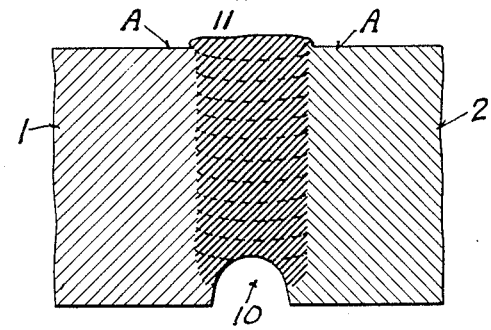
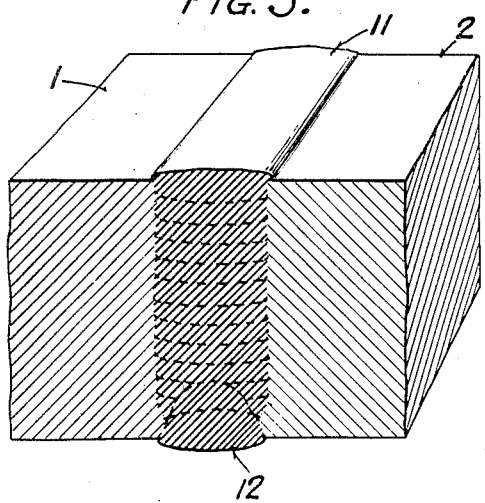
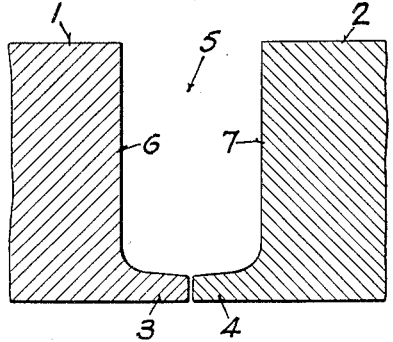
INVENTOR.
RICHARD STRESAU
BY
ATTORNEY.

June 30, 1931.  R. STRESAU  1,812,123
METHOD OF ELECTRICALLY WELDING THICK METAL PLATES
Filed Feb. 12, 1929   3 Sheets-Sheet 2

INVENTOR.
RICHARD STRESAU
BY
ATTORNEY.

June 30, 1931.  R. STRESAU  1,812,123
METHOD OF ELECTRICALLY WELDING THICK METAL PLATES
Filed Feb. 12, 1929  3 Sheets-Sheet 3

INVENTOR.
RICHARD STRESAU
BY Elwin A. Andrus
ATTORNEY.

Patented June 30, 1931

1,812,123

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

METHOD OF ELECTRICALLY WELDING THICK METAL PLATES

Application filed February 12, 1929. Serial No. 339,293.

This invention relates to methods of electrically welding thick metal plates and has for its object the overcoming of certain difficulties which arise in the application of electric arc welding to thick metal plates.

The invention will be described with reference to the accompanying drawings in which:

Figure 1 is an end elevation illustrating the thick metal plates prepared and in position for the welding operation.

Fig. 2 is a similar view showing the first step in the welding operation.

Fig. 3 is a similar view showing the second step in the operation.

Fig. 4 is a similar view showing the third step in the welding operation.

Fig. 5 is a perspective view illustrating the finished weld.

Fig. 6 illustrates a modification of the welding groove shown in Fig. 1.

Figs. 7, 8, 9, 10, 11, and 12 are similar to Figs. 1, 2, 3, 4, 5, and 6, respectively, and illustrate a modified application of the invention.

Figure 13:
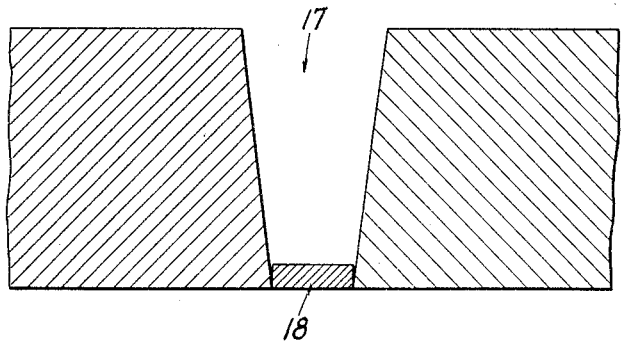

Fig. 13 illustrates a modified application of the invention.

Figure 14:
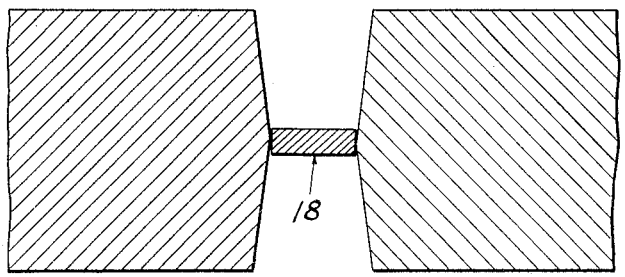

Fig. 14 illustrates another modified application of the invention.

Figure 15:
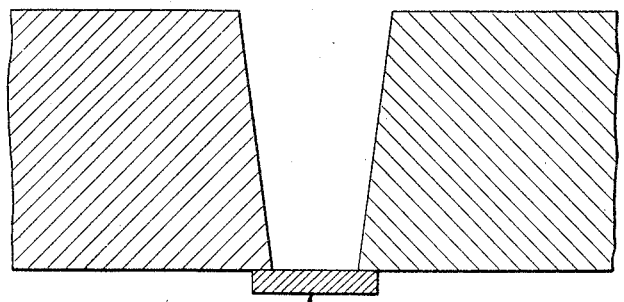

Fig. 15 illustrates another modified application of the invention.

The thick sheet metal plates 1 and 2 have their edges chamfered to provide lips 3 and 4, respectively, which form the bottom of a welding groove 5 provided between the edges to be welded. The welding groove preferably has its side walls 6 and 7 diverging at approximately a fifteen degree taper, the purpose of which will be specifically pointed out hereinafter.

The lips 3 and 4 are preferably spaced a predetermined amount, as shown in Fig. 1, to permit shrinkage of the first layers of the weld and to increase the penetration of fusion of the metal. The edges being placed in welding relation, a metallic fusible welding rod 8 is fused into the welding groove by establishing an arc 9 between the metal to be welded and the weldrod, as shown in Fig. 2. The welding metal is deposited in layers which may vary in thickness depending upon the size and composition of the weldrod and the welding current employed.

The deposited metal fuses with the bottom and side walls of the groove, as shown in Fig. 2, to form an integral structure therewith. As the fused metal cools, the same contracts and the lips 3 and 4 thereupon are drawn together. While the lips may be placed in contact prior to the first welding operation, the contracting of the fused deposited metal will then be limited and the deposited welding metal may be placed under a greater tension stress.

The contracting of the deposited metal in successive layers draws the side walls 6 and 7 of the groove towards each other thereby maintaining a predetermined uniform width for the bottom of the groove at any given time during the welding operation. This is particularly advantageous since it maintains a uniform width of deposited metal from bottom to top of the groove, and by this means a minimum width of groove may be employed without danger of closing the upper opening of the groove and interfering with the welding operation.

Heretofore the welding groove, which is of substantial depth, has been filled by repeated passes of the arc and the weld thus provided considered complete. However, defects arise where the plates to be welded lack that degree of flexibility which is necessary to obtain a perfect alignment of the lips 3 and 4. This is particularly true with plates of two inches or more in thickness such as those employed in the manufacture of large oil cracking pressure vessels as disclosed in Reissue Patent No. 16,865 to L. R. Smith.

Difficulties which arise in machining the edges where the plates are thick, and the rigidity of the plates, tend to prevent the alignment of the lips, and where the lips are not in exact alignment, it is difficult to weld the same together. Consequently, where the welding groove is filled as heretofore with deposited fused welding metal, the lips are often imperfectly welded. Furthermore, where the groove is of substantial depth, the tension set up in the weld has a tendency to crack the plate adjacent to the weld as at A in Fig. 4. If the groove is of substantial depth the imperfect penetration and fusion of the lips leaves a crack therebetween which tends to extend itself into the successive welding layers above to produce what is known as a shrinkage crack. This crack can not be detected from above since the top layer of the weld is not affected thereby.

According to the present invention, the groove is partly filled with welding metal. In practice the groove is approximately half filled, as shown in Fig. 2. The lips 3 and 4, and preferably a part of the welding metal are then cut away, as shown in Fig. 3, by any suitable means, such for example as a high temperature electric arc, to provide an auxiliary welding groove 10 on the under side of the weld. It has been found that some electrodes having high temperature characteristics may be utilized for performing both the welding and cutting operations. The first welding groove is then completely filled, as shown in Fig. 4, and in the last step of the welding operation the auxiliary groove is filled with deposited fused welding metal.

If the tension of the fused metal in the main welding groove becomes too great, the first layers of metal deposited therein will crack and there will be no injury to the plate metal adjacent the weld. Should such a shrinkage crack become apparent upon inspection after completing the filling of the main welding groove, the layers of the weld containing the crack may be cut away prior to depositing metal in the auxiliary welding groove.

The auxiliary groove may be filled prior to the completion of the filling of the main welding groove. When this is done the stresses set up in the weld are sufficiently balanced to substantially prevent shrinkage cracks.

The welding metal is fused throughout the thickness of the plates, as shown in Fig. 5, and may have beads 11 and 12 formed from deposited metal at the top and bottom respectively of the weld.

In Fig. 6, the side walls 11 and 12 of the groove are substantially parallel, as disclosed in my Patent No. 1,599,927. For certain types of work, this is advantageous, although I find it generally preferable to employ the type of groove shown in Fig. 1, since unless a wider groove is employed the parallel side walls may be drawn together by contraction of the fused welding metal and thereby converged to somewhat close the opening at the top of the groove and interfere with the travelling of the weldrod along the seam.

Figure 7:
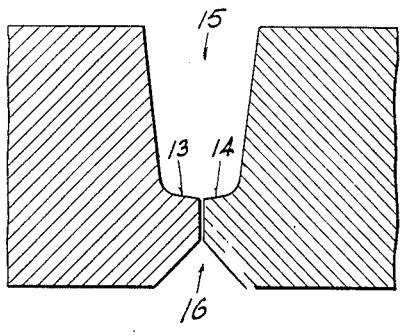

Attempts have been made heretofore to employ a double welding groove, such as that shown in Fig. 7, or a similar type providing V-shaped grooves with the central portion of the edges meeting to form the bottom of the grooves. However, the same difficulties arise with this type of scarf, making the alignment of the edges difficult and the weld at the meeting lips unreliable.

Figure 8:
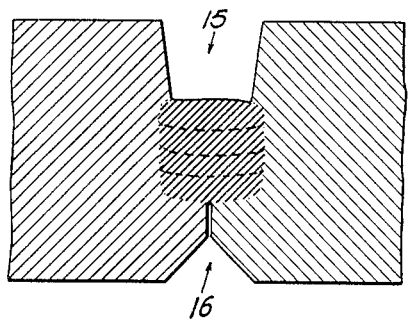
Figure 9:
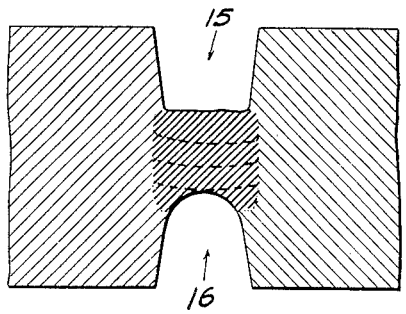
Figure 10:
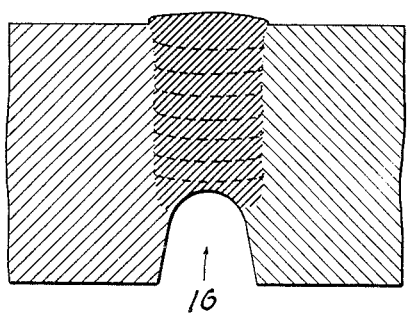
Figure 11:
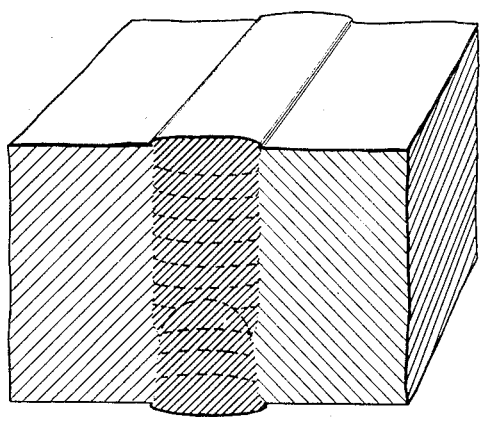

In Figs. 7, 8, 9, 10, and 11, the operations set forth above are illustrated as applied to thick metal plates having lips 13 and 14 meeting above the lower plane of the edges to provide a main welding groove 15 above the same and an auxiliary welding groove 16 below. When the main welding groove is sufficiently filled with welding metal, as shown in Fig. 8, the lips are removed to provide the complete auxiliary groove 16.

Figure 12:
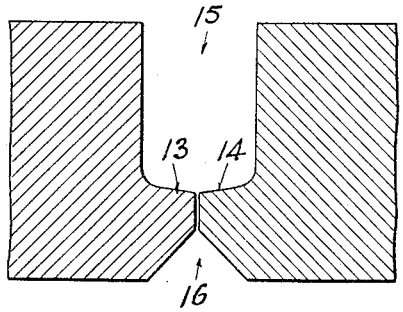

Fig. 12 shows grooves similar to those shown in Fig. 7, but having side walls substantialy parallel like those in Fig. 6.

The lips form a welding dam between the edges to be welded, although it is not necessary that this dam be integral with said edges. Thus in Figures 13, 14 and 15 of the drawings a welding dam is shown as constituting a separate strip of metal arranged between or adjacent the edges to be welded.

In Fig. 13 the bottom of the welding groove or recess 17 is formed by a metal plate 18 arranged between the edges to be welded at the bottom thereof. In Fig. 14 the plate is placed centrally of the edges to provide welding grooves or recesses of the type shown in Fig. 7. In Fig. 15 the plate is placed below the edges to be welded and the welding groove or recess is substantially as deep as the edges. Due to the difficulty in obtaining a perfect weld between these plates and the edges to be welded, it is advisable to remove the plate in the same manner as heretofore described with reference to the lips which were integral with the edges to be welded and thereby form an auxiliary welding groove for the continuation of the welding operation as above set forth.

When the plates to be welded are of extreme thickness, it has been found preferable to relieve the weld from excessive tension stresses. This may be done by peening the successive layers of the weld by a succession of hammer blows in any suitable manner as the same cool and become plastic to counteract the tendency of the metal to contract. By peening the layers of the weld, the time required for welding a given groove may be shortened to a fraction of the ordinary time without increasing the danger of cracking tht metal plates being welded.

While the invention is particularly applicable to the welding of plates two inches or more in thickness, certain features of the invention may be employed in the welding of plates which are difficult to align regardless of their thickness. Plates as thick as six inches have been successfully welded by application of the invention.

I claim:

1. The method of electric arc welding thick metal plates which comprises providing a welding groove or recess between the edges to be welded, said groove being closed at the bottom and having its side walls diverging to compensate for the contraction of the fusing welding metal during the welding operation and to thereby maintain a substantially uniform minimum width of deposited metal, fusing welding metal into said groove to partially fill the same, then cutting away the metal which formed the bottom of the groove to provide an auxiliary welding groove, and finaly completing the weld by filling said grooves with fused welding metal.

2. The method of electric arc welding thick metal plates which comprises providing a welding groove between the edges to be welded, said groove being closed at the bottom by lips integral with the metal to be welded, fusing welding metal into said groove in successive layers and simultaneously therewith maintaining a predetermined width of groove for reception of the fusing welding metal, removing the adjacent portions of the lips to provide an auxiliary welding groove, and finally completing the weld by filling said grooves with fused welding metal.

3. The method of electric arc welding metal plates which comprises providing a welding groove or recess between the edges to be welded, fusing welding metal into said groove by means of an electric arc, then cutting away the metal which formed the bottom of the groove to provide an enlarged auxiliary welding groove, and finally filling said welding grooves with deposited fused welding metal to complete the weld.

4. The method of electric arc welding metal plates which comprises providing lips integral with the edges to be welded, placing said plates in welding position with said lips forming the bottom of a welding groove, fusing welding metal into said groove to partially fill the same, then removing adjacent portions of said lips to provide an auxiliary welding groove, and finally filling said welding grooves with deposited fused welding metal to complete the weld.

5. The method of electric arc welding metal plates which comprises providing lips integral with the edges to be welded, placing said plates in welding position with said lips spaced a predetermined amount and forming the bottom of a welding groove, fusing welding metal into said groove by means of an electric arc, then removing adjacent portions of said lips to provide an auxiliary welding groove, and finally filling said respective welding grooves successively with fused welding metal to complete the weld.

6. The method of electric arc welding metal plates which comprises providing a welding groove between the edges to be welded, said groove being closed at the bottom by lips integral with the metal to be welded, fusing welding metal into said groove in successive layers by means of an electric arc, peening the fused welding metal as the same cools to relieve tension stresses which may have been set up therein, then forming an auxiliary welding groove in the place of said lips, and finally filling said welding grooves with deposited fused welding metal and peening said metal as the same cools.

7. The method of electric arc welding which comprises arranging the metal parts to be welded in position for welding with a welding dam therebetween, depositing welding metal on one side of said dam, cutting away said dam and filling in the cut-away region with fused welding metal.

8. In electric arc welding of metal parts having juxtaposed portions of limited extent, the method which comprises depositing fused welding metal on one side of the juxtaposed portions, cutting away said portions and filling in the cut-away portion region with fused welding metal.

9. In electric arc welding of metal parts having juxtaposed portions of limited extent, the method which comprises depositing welding metal on one side of the juxtaposed portions and fusing the deposited metal with the metal of the parts being welded, removing unfused parts of said juxtaposed portions from the other side, and filling in the cut-away region with fusing welding metal.

10. The method of electric arc welding which comprises arranging the metal parts to be welded in position for welding with a welding dam therebetween, depositing welding metal on one side of said dam and fusing the deposited metal with the metal of the parts being welded, removing unfused parts of the welding dam from the other side, and filling in the cut-away region of the dam with fusing welding metal.

In testimony whereof, I have signed my name at Milwaukee, Wisconsin, this 8th day of February, 1929.

RICHARD STRESAU.